(12) United States Patent  
Ranmuthu

(10) Patent No.: US 8,134,792 B2
(45) Date of Patent: Mar. 13, 2012

(54) PREAMPLIFIER AND METHOD FOR SYNCHRONIZATION WITH BIT PATTERNED MEDIA

(75) Inventor: Indumini Ranmuthu, Plano, TX (US)

(73) Assignee: Texas Instruments Incorporated, Dallas, TX (US)

(*) Notice: Subject to any disclaimer, the term of this patent is extended or adjusted under 35 U.S.C. 154(b) by 100 days.

(21) Appl. No.: 12/576,400

(22) Filed: Oct. 9, 2009

(65) Prior Publication Data

US 2010/0246048 A1    Sep. 30, 2010

Related U.S. Application Data

(60) Provisional application No. 61/164,316, filed on Mar. 27, 2009.

(51) Int. Cl.
*G11B 5/09* (2006.01)

(52) U.S. Cl. ............................................. 360/51; 360/68

(58) Field of Classification Search .................. None
See application file for complete search history.

(56) References Cited

U.S. PATENT DOCUMENTS

| | | | |
|---|---|---|---|
| 6,738,207 B1 | 5/2004 | Belser | |
| 6,754,017 B2 | 6/2004 | Rettner | |
| 7,133,229 B2 | 11/2006 | Semba | |
| 7,324,294 B2 | 1/2008 | Moser | |
| 7,492,540 B2 | 2/2009 | Albrecht | |
| 2008/0074774 A1 | 3/2008 | Izumi | |
| 2008/0304173 A1 | 12/2008 | Albrecht | |
| 2009/0002865 A1 | 1/2009 | Venkataramani | |
| 2009/0002867 A1 | 1/2009 | Gage | |

*Primary Examiner* — Jason Olson

(74) *Attorney, Agent, or Firm* — Dawn V. Stephens; Frederick J. Telecky, Jr.

(57) ABSTRACT

A preamplifier and method writes data synchronized with the passing of a write head in a magnetic storage device over bit islands in discrete patterned recording media. The preamplifier contains a write pre-driver that conditions write data, a synchronization circuit that accepts a delay offset value and a write clock and produces a delayed clock, and a write output driver that is gated by the delayed clock to produce write pulses for magnetizing the bit islands. Gating the write output driver using the delayed clock results in more accurate synchronization than delaying the write data into the preamplifier due to the reduction of the overall length and variability of interconnects and transistors in the intervening circuitry. Write clock generation circuitry, as well as bit position sensor circuitry for use with bit position signals produced by a read head or by a separate bit position sensor, are optionally integrated into the preamplifier, close to the write output driver and write head, for further improvements in delay accuracy and stability. Write pulses produced by the preamplifier are thus well aligned with the bit islands, resulting in higher magnetization and an improved bit error rate.

18 Claims, 8 Drawing Sheets

PREAMPLIFIER AND METHOD FOR SYNCHRONIZATION WITH BIT PATTERNED MEDIA

CROSS-REFERENCE TO RELATED APPLICATIONS

This application claims the benefit of U.S. Provisional Application No. 61/164,316, filed Mar. 27, 2009 by the present inventor.

BACKGROUND OF THE INVENTION

1. Field of the Invention

The present invention relates generally to the field of magnetic recording disk drives, and more particularly, to a preamplifier and method for synchronizing write pulses with bit islands in discrete bit patterned recording media.

2. Description of the Related Art

Magnetic recording disk drives for data storage conventionally use disks coated with a continuous layer of magnetic alloy materials or media, rotated at high speed using a spindle motor. Data bits are written in radially-separated concentric tracks on the surface of the spinning magnetic medium by applying a magnetic field using an inductive write head that is driven by current pulses from a write driver circuit to magnetize regions in the medium. The write driver and associated write data path circuitry are commonly integrated into a preamplifier chip together with read channel preamplifier circuitry. The areal density of data, corresponding to the size of bits that may be written, is physically limited in continuous media by cooperative effects that are a combination of magnetic domain size and alloy material grain size. Typically several tens of grains are used per bit to obtain noise reduction by averaging over grain positions and orientation, in order to limit so-called transition noise. Reducing the size of a bit by using a smaller number of grains per bit increases transition noise unacceptably. Reducing the size of the grains likewise runs into a limit called the superparamagnetic limit, in which smaller grains are susceptible to thermal instability of their magnetization. Patterning media into small isolated blocks or "bit islands" of magnetic material separated by nonmagnetic areas has been proposed to overcome these limits. Each bit island can consist of a single grain or of a few strongly-coupled grains that switch magnetization as a single domain, thereby avoiding transition noise. These media, in which individual bits are physically isolated and separated along each circumferential track as well as radially, are sometimes referred to as bit patterned media, to distinguish them from earlier patterned media technologies that created separate tracks, but did not separate bits along a track. It is projected that the use of bit patterned media will be needed at data densities of approximately one terabit per square inch, which will be reached in the next few years given current trends in magnetic recording density.

In conventional magnetic recording disks with continuous media, a read clock signal is recovered from the readback data, typically using a phase-locked loop (PLL) clock recovery circuit within the digital read channel chip in the drive controller, to be used in sampling the read data. There is no need to synchronize the writing of data with the position of continuous media since all of the media contains magnetic material. However, for bit patterned media, the locations of the bits to be written are predefined as the positions of the bit islands, and the write head needs to be pulsed to precisely switch the write fields as the head passes over each bit island.

Using a conventional unsynchronized write clock is not effective because imperfections in media patterning, spindle speed stability, disk eccentricity, and temperature gradients lead to varying intervals between data islands. A slip in the phase of write pulses can cause the attempted writing of data to non-magnetic areas between the bit islands, resulting in a high bit error rate for the write/read cycle. Thus closed-loop control of the frequency and phase of the write clock is required to correct the timing of write pulses.

These issues have been recognized, and various approaches and circuits for sensing the position of bit islands, and for generating and adjusting timing signals and programmable delays to be used in write synchronization have been proposed. In most cases, these approaches attempt to align the write pulses by applying a delay to the write data presented to the write driver, but fail to fully account for variability in electronic and physical propagation delays in the clock recovery function and in the write data path between the delay generator and the write head. Thus there remains a need for improved methods of synchronization of writing to bit patterned media, as well as preamplifier architectures and designs optimized so as to minimize sources of timing inaccuracies.

SUMMARY OF THE INVENTION

These and other problems associated with the prior art are addressed by the present invention, which provides a preamplifier for use in a patterned media disk drive, and a method for synchronizing write pulses with bit islands in discrete patterned recording media during operation. By gating the write data signals in the write output driver section of the preamplifier using a delayed clock for synchronization instead of delaying the write data signals, more accurate timing of the write pulses is obtained. Additional advantages and reductions in timing uncertainty are realized by integrating synchronization circuitry into the preamplifier, and by optionally integrating the write clock source in the preamplifier as well. Bit position sensing circuitry may be included within the preamplifier to use in deriving the write clock from sensing the bit islands in the patterned media, either using a read head or a separate bit position sensor. Integrating this circuitry close to the synchronization circuitry can further improve the timing performance of the delayed clock and hence the write pulses, due to further reductions in the overall length and variability of the interconnects and transistors in intervening circuitry over part-to-part and temperature variations.

More specifically, the present invention provides a preamplifier for a magnetic storage device having a write head and a recording medium patterned into discrete magnetizable bit islands. The preamplifier contains a write pre-driver that accepts and conditions write data, and a write output driver that receives conditioned write data from the preamplifier and produces write pulses for magnetizing the recording medium. A synchronization circuit accepts a write clock and a delay offset signal and produces a delayed clock from the write clock and the delay offset. The delayed clock produced by the synchronization circuit is used to gate write data in the write output driver so that write pulses produced by the write output driver are synchronized with the passing of the write head over the bit islands.

The present invention also provides a method for synchronization of write pulses to bit islands of a patterned media disk drive. A write clock is provided having a frequency related to the bit frequency determined by the density of bit islands along a track and the rotation rate of the recording medium.

For example, the write clock may be at the bit frequency, a multiple of the bit frequency, or have another rational relation to the bit frequency. An optimal value of a delay offset is determined that will result in synchronization of write pulses with the bit islands. Using the delay offset and the write clock, a delayed clock is generated. The delayed clock is used to gate the write data signals in the write output driver section of the preamplifier to produce write pulses synchronized for magnetizing the bit islands.

Other features and advantages of the present invention will be apparent to those of ordinary skill in the art upon reference to the following detailed description taken in conjunction with the accompanying drawings, and the appended claims.

DESCRIPTION OF THE VIEWS OF THE DRAWINGS

For a more complete understanding of the present invention, and the advantages thereof, reference is now made to the following description taken in conjunction with the accompanying drawings, in which.

DETAILED DESCRIPTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

Figure 1:
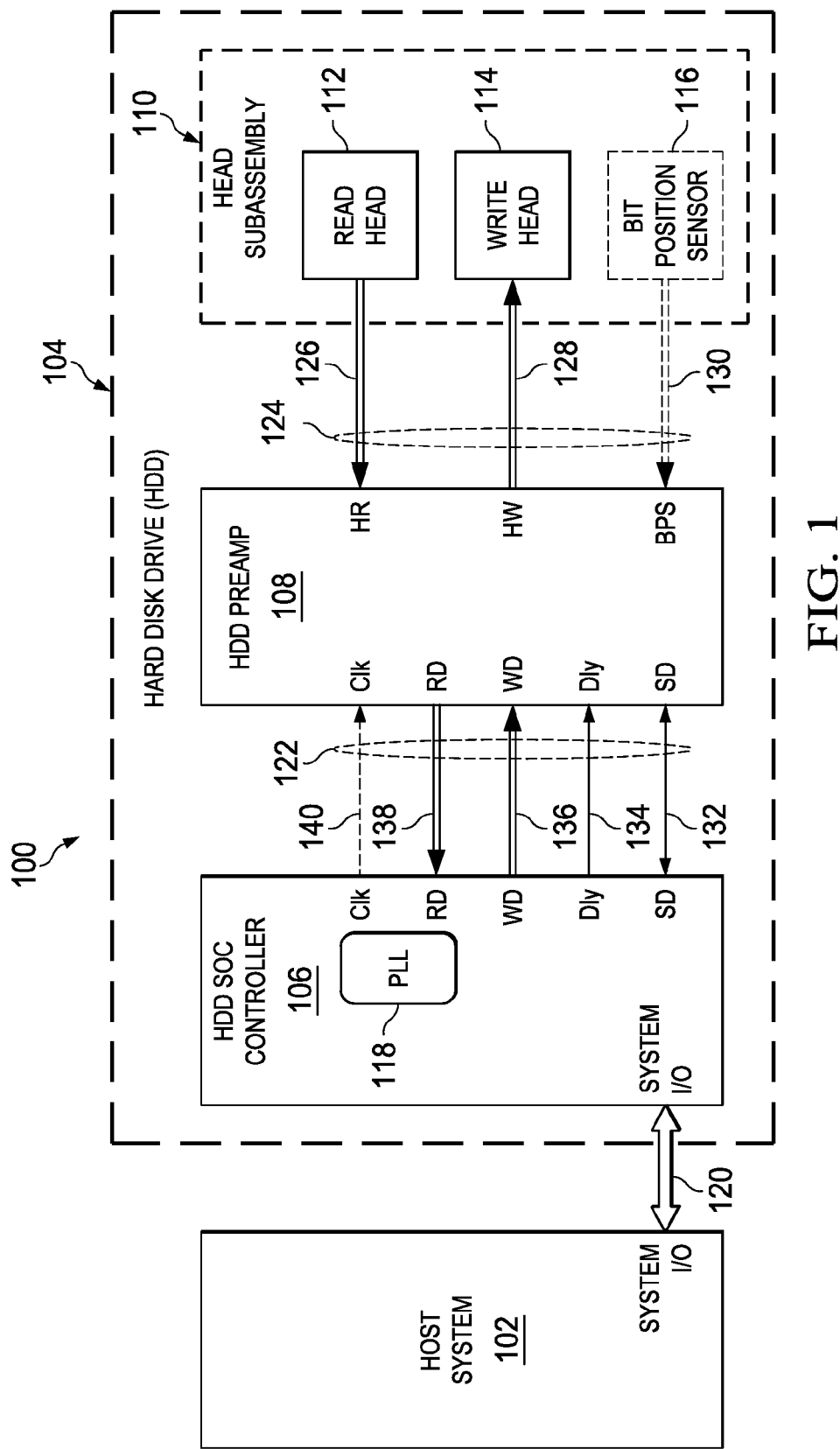
FIG. 1 is a block diagram depicting a data storage system according to an embodiment of the present invention.

Referring now to FIG. 1, a block diagram of a representative data storage system 100 according to the present invention is shown. A host system 102, which may be a computer system, a music player, a game system, a network-connected server, or other data processing system is connected through a digital system input/output interface 120 to a hard disk drive (HDD) 104. HDD 104 may be physically contained within the host system 102, or be housed in a separate external enclosure. Interface 120 is typically a high-speed data peripheral interface designed specifically for high-speed data transfer from a storage device such as hard disk drive 104, and may be a parallel interface as indicated by the block arrows in this diagram. Hard disk drive 104 contains several principal electronic components shown here explicitly that are related to writing and reading data to and from the magnetic media, in addition to other components (not shown) including the media disk platter or platters themselves, each having one or both surfaces coated with a recording medium made of a magnetic material, electromechanical components including a motor to rotate a spindle serving as an axle for the platter or platters, a voice coil actuator (motor) for head positioning, interconnects and enclosures, and electronics primarily related to spindle motor control, head positioning, and data buffering.

Shown within hard disk drive 104 in FIG. 1 are an HDD controller 106, which may be implemented in a system-on-chip (SOC), which contains mainly digital circuitry to process read and write data in the digital domain, a preamplifier 108, which operates mostly in the analog domain to amplify read and write data signals, and a head subassembly 110. Head subassembly 110 typically includes a read head 112 and a write head 114, and may optionally include a bit position sensor 116 specifically intended to read synchronization data from bit patterned media. The head subassembly 110 may also include a head carrier or slider, mountings, flexible circuit (flex) interconnects, as well as the heads and sensors shown here. Furthermore, there may be more than one head subassembly, such that one or more is associated with each surface of a platter or multiple platters. The HDD controller 106 may be integrated into a single system-on-chip SOC as shown, or implemented on a printed circuit board (PCB) with some of the functions of the controller performed in separately packaged integrated circuits (ICs). For example, a read channel IC containing the circuitry for conversion of amplified analog read signal to digital data, clock recovery and sampling thereof, and multiplexing or serialization/deserialization may be a separate IC, or alternatively, these functions could be integrated onto preamplifier (preamp) IC 108. As shown here, read clock recovery may be performed by a phase-locked loop (PLL) 118 within HDD SOC controller IC 106, which may generate a clock signal Clk 140 from incoming read data RD 138.

Read synchronization as well as radial positioning of the head subassembly 110 with respect to a media disk platter may be assisted using "servo sectors" that are approximately radial regions containing data segments written magnetically at periodic intervals around the disk circumference in each data track. Modern disk drives may also use "zone bit recording," in which data tracks are grouped radially into a number of annular data bands or zones having bit density, with these zones each recorded with different numbers of circumferential sectors containing read/write data. This allows the longer outer tracks to store more sectors of data per track, but it also means that the bit frequency and thus the rate of writing and reading is higher on tracks within outer zones, perhaps twice as high as in inner zones. Therefore higher frequency clocks are required for reading and writing to tracks at larger radii on the disk medium. In some implementations, read clock generation uses not only read data signals, but signals derived from synchronization data fields written into each track to support zone bit recording. Besides the constant-frequency servo sectors and synchronization sectors suitable for read clock generation that have just been described, even more synchronization sectors may need to be written in each track to be used in achieving the write clock accuracies required for write synchronization with bit patterned media.

Preamplifier 108 communicates with HDD controller 106 through interconnect 122, which may include a flex circuit, and with head subassembly 110 through interconnect 124, which is also typically a flex circuit. Note that interconnect 124 carries high-speed analog signals that are typically communicated using differential signaling, and head read (HR) signal 126, head write (HW) signal 128, and bit position sensing (BPS) signal 130 are all shown as double lines to indicate this. (BPS signal 130 is shown with dashed lines to indicate that it is optional and is not used in all embodiments of the system.) Similarly, interconnect 122 carries some high-speed digital signals, read data (RD) 138 and write data (WD) 136, that may be representative of differential pairs. For example, RD in interconnect 122 may be considered shorthand for a pair of signals RDX and RDY, and in interconnect 124, HW may be considered shorthand for the pair of signals HWX and HWY. Other signals carried in interconnect 122 between preamplifier 108 and HDD controller 106 include digital signals serial data (SD) 132, delay (Dly) signal 134, and optional write clock (Clk) signal 140. These signals will be discussed in more detail later.

Figure 2:
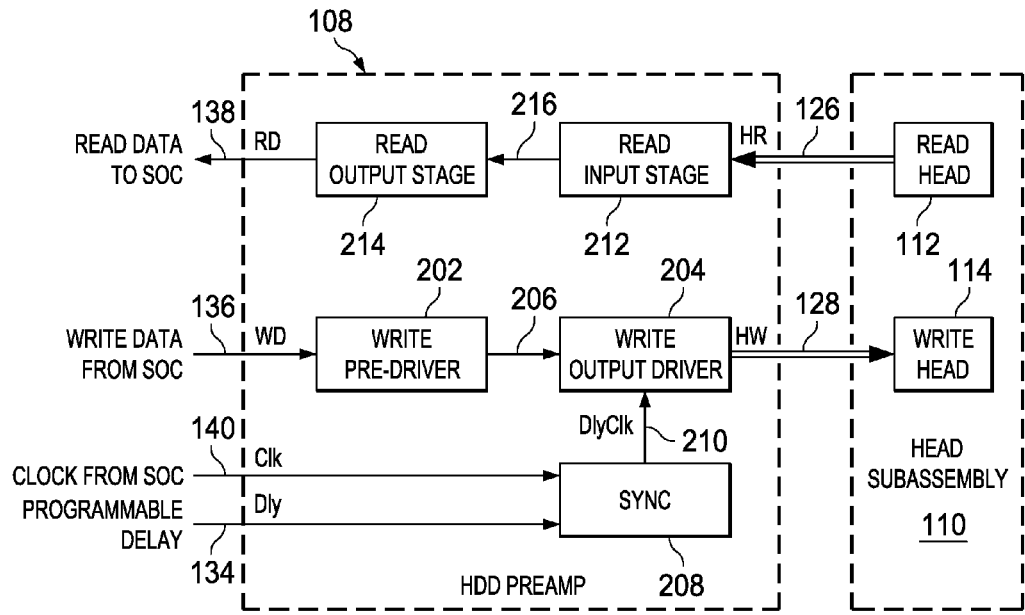
FIG. 2 is a block diagram depicting a preamplifier according to an embodiment of the present invention in which a write clock is provided from an external source.

FIG. 2 is a block diagram of a preamplifier 108 capable of write synchronization to bit patterned media that may be used with minimal alteration to the architecture of conventional hard disk drives. Preamplifier 108 has a write data path containing write pre-driver 202 that accepts write data 136 from the SOC HDD controller 106 (not shown in FIG. 2, but shown in FIG. 1), conditions the write data, and presents the conditioned signals 206 to write output driver 204. Note that the term "write output driver" is used herein to refer specifically to later or output stages in a preamplifier write data path. In particular, write pre-driver 202 buffers the incoming write data, and generates sequencing information, shape inputs, polarity write current, overshoot, and duration settings, and bias current control settings for the write output driver 204. Write output driver 204 performs waveshape control and power amplification to generate write pulses in the form of HW signal 128 to drive write head 114. In particular, write output driver 204 contains circuits for DC bias control, detailed waveshape control for write pulse shaping, and H-bridge power output drivers to drive the write head(s) 114. For speed and current handling, these circuits may be implemented in a bipolar, BiCMOS, and/or SiGe technology. Preamplifier 108 also contains a read data path consisting of read input stage 212, which preamplifies signals 126 from read head 112, and presents the preamplified read signal 216 to read output stage 214 for output of digital read data 138 to HDD controller 106. Note that read data 138 and write data 136 signals are shown in FIG. 2 and henceforth as single lines instead of double lines, but they may actually be implemented as pairs of differential signals. Not shown is a serial interface accepting and communicating serial data 132 to be used in performing various and control and reporting functions. Such functions include configuring preamp settings to control write current pulse shapes, read head bias, head selection, power-down features, and the like, as well as reporting temperature and other status indications to the HDD controller 106.

In the embodiment illustrated in FIG. 2, a write clock 140 is supplied by HDD controller 106, which may derive it from the read clock, for example using PLL 118. Write clock 140 is a signal that provides some of the timing information necessary to ensure that write data will be presented to the magnetic media with the proper frequency and timing for writing to discrete bit islands in the patterned magnetic media. It may be periodic at the bit frequency, which is the frequency at which bit islands pass under the write head, or at a higher or lower frequency than the bit frequency such as a multiple or sub-multiple of the bit frequency. Write clock 140 may even be a different kind of timing signal that is not strictly periodic in relation to the bit frequency, but for example having a different frequency, for example, derived from the synchronization sectors or synchronization data fields described previously. Regardless of its frequency or waveform, the term "write clock" will be used herein to refer to timing signal 140. This write clock needs to be delayed by an appropriate amount to synchronize the write pulses. The desired amount of delay is conveyed by delay signal 134, which constitutes an optimal value of a delay offset for the write clock. Delay signal 134 may be a multi-bit digital value (for example, a four-bit delay value indicating up to sixteen different delay offset values) sent over a serial data path (e.g. using signal SD) or over a parallel data path, a signal derived from the write clock, or an analog control voltage. A digital value is preferred, and the delay offset value may be generated in the read channel circuit or elsewhere in the HDD controller 106, for example using digital signal processing or other means to obtain a bit error rate or other metric for optimization. But the generation of delay offset value that is communicated by delay signal 134 could also be incorporated into a circuit, controller, or processor (not shown) within preamplifier 108, in which case an external connection for Dly 134 might not be required. The synchronization function is performed by synchronization circuit 208, which accepts write clock (Clk) signal 140 and the delay (Dly) signal 134, and produces a delayed clock (DlyClk) 210 to be used in write output driver. The design of synchronization circuit 208 depends on the form of delay signal 134 that is used, digital or analog, but is preferably digital. In addition, a calibration may be performed during manufacturing to take into account part-to-part variations e.g. of the read amplifier stages 212 and 214, write pre-driver 202 and write output driver 204, their temperature and supply voltage dependence, and similar factors, and correction factors can be stored in a lookup table in volatile or nonvolatile memory onboard the HDD controller 106, or in the preamplifier 108. Thus in the embodiment as shown in FIG. 2, the write clock 140 and delay signal 134 are generated by circuitry in HDD SOC controller 106, and the synchronization function is performed onboard the preamplifier chip 108, where the write output driver is gated by the delayed clock 210 to accurately and reproducibly delay the write pulses so that they are optimally aligned with bit islands on the bit patterned media.

It should be noted that although the delay offset value conveyed by delay signal 134 may be generated in the read channel circuit or elsewhere in the HDD controller 106 as discussed above in reference to FIG. 2, this is not necessarily required. Referring again to FIG. 1, it is also not required to derive the delay offset value within preamplifier 108, or even within hard disk drive 104. For example, host system 102 may run drive optimization software during setup, during a startup procedure, or occasionally during operation of data storage system 100 and in turn may provide signals to adjust parameters in the hard disk drive 104 in order to optimize a bit error rate for the read data 138 or some other optimization metric. These signals can include a delay offset value derived by host system 102 and conveyed by delay signal 134 to preamplifier 108 in order to ensure that the write data will be written to an optimal position on the bit islands. Regardless of where or how delay signal 134 is derived, it is desirable to perform a synchronization function within the write channel of preamplifier 108 as close as possible to the output of write output driver 204 shown in FIG. 2. This minimizes the delays, and more particularly, the variability of the delays, in the write data path and enables tighter control of timing of write pulses to the bit islands on the patterned media.

Figure 3:
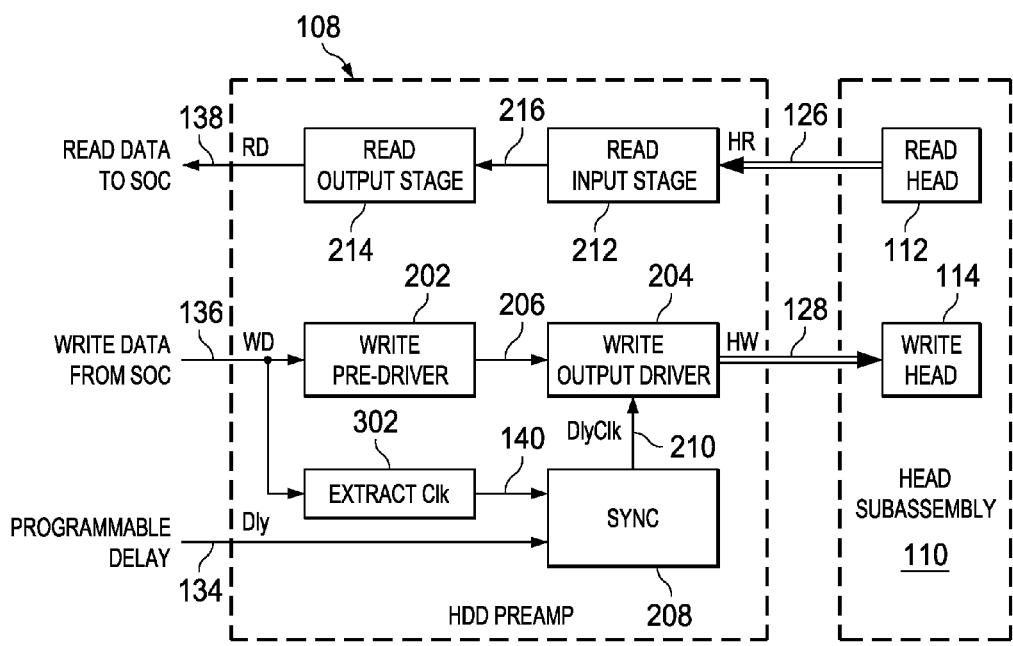
FIG. 3 is a block diagram depicting a preamplifier according to an embodiment of the present invention in which a write clock is extracted from incoming write data.

A second embodiment of a preamplifier 108 is shown in FIG. 3, in which a write clock is not provided by the HDD controller 106. Since such an input is not available, a write clock 140 must be generated onboard the preamplifier 108. One way to do so is to provide a clock extraction circuit 302 that extracts write clock 140 from the incoming write data 136. Such a clock extraction circuit may use any of a number of so-called "clock recovery" techniques known in the art, and may include, among other subcircuits, a phase-locked loop or other circuitry to generate a timing signal that may be used for synchronization of write data to bit islands in the patterned media. Then this clock 140 can be used as before in conjunction with delay signal 134 as inputs to synchronization circuit 208, which generates delayed clock 210 used to gate write output driver 204.

In embodiments such as that shown in FIG. 3, the delay signal 134 incoming to the preamplifier 108 may not be as accurate as required, since it is generated outside the preamplifier 108 by HDD controller 106 or host system 102 with no knowledge of the phase of the write clock 140. Further optimization of the delay offset might be achieved within the preamplifier 108. Thus the externally-supplied delay signal 134 might be considered to carry a "coarse" delay offset value, with an additional "fine" delay offset value generated by circuitry and/or processor (not shown) onboard preamplifier 108. Such a combination of coarse and fine adjustments can be implemented with outer and inner feedback control loops for delay optimization, in which the inner control loop may be implemented using hardware within preamplifier 108 that has a higher bandwidth and quicker response associated with its incorporation close to the write head. The outer control loop could then, for example, be implemented using digital signal processing or drive optimization software within HDD controller 106 or host system 102.

Figure 4:
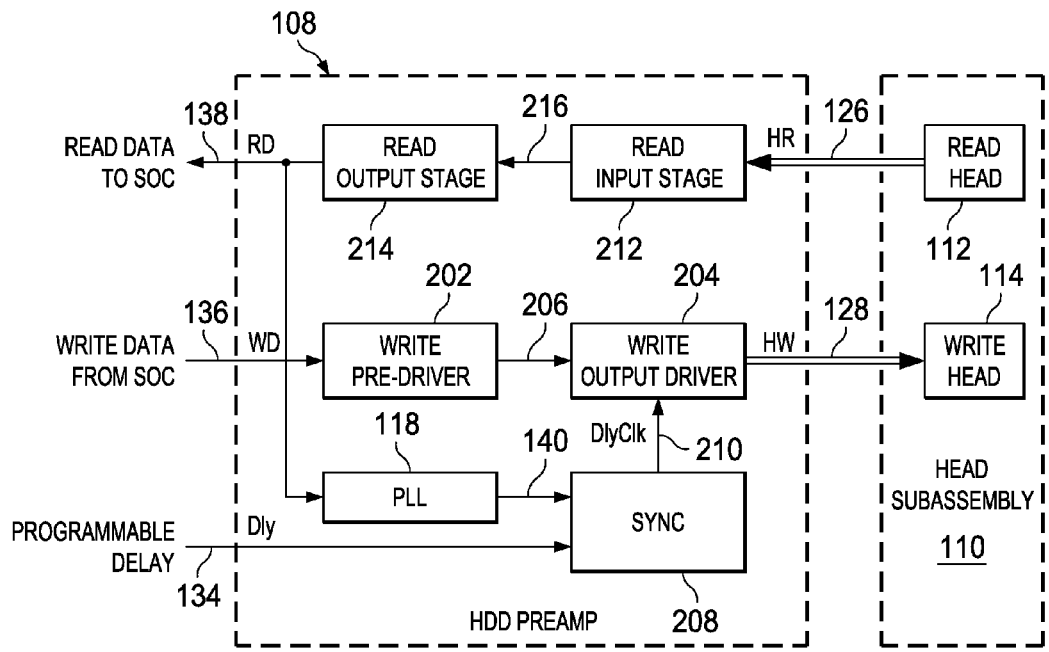
FIG. 4 is a block diagram depicting a preamplifier according to an embodiment of the present invention in which a write clock is recovered by a phase-locked loop from read data.

FIG. 4 is a block diagram showing an alternative method of generating a write clock onboard preamplifier 108. In this case, a phase-locked loop 118 or similar clock recovery circuit is used to recover a write clock 140 from the outgoing read data 138. Delay offset value settings delivered over delay signal 134 will be different in this implementation from the settings generated for the embodiment of FIG. 3, but similar outer and inner control loops can be implemented to optimize speed and accuracy. The advantage of this implementation over embodiments discussed previously is that by moving the PLL 118 from within the controller 106 into the preamp 108, propagation delays from the flex circuit interconnect 122 and the read channel within the controller 106, and more particularly the variability of these delays, are eliminated.

Figure 5:
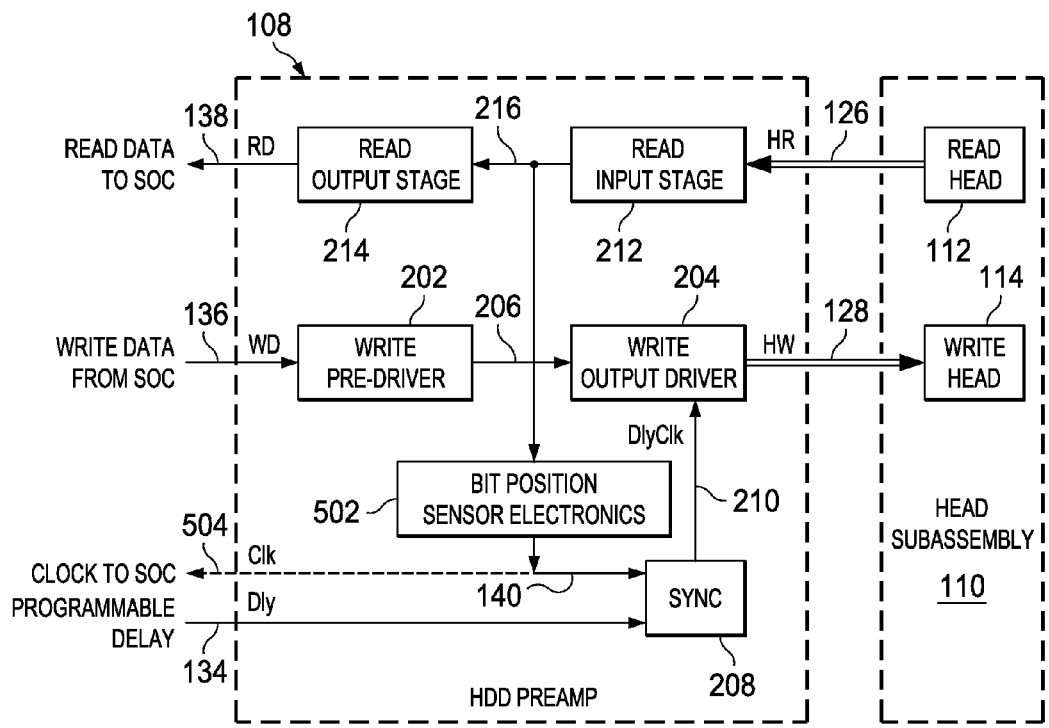
FIG. 5 is a block diagram depicting a preamplifier according to an embodiment of the present invention in which a write clock is derived from bit position signals sensed by the read head.

Referring next to FIG. 5, a block diagram of a preamplifier 108 is shown in which the read head 112 is used to sense bit position data. In this embodiment, the read head senses each bit island independent of what data may be stored in it. Thus, the timing information is derived directly from the structure of the medium, and synchronization data bursts spaced along a track do not necessarily need to be written onto the medium from which to derive a write clock signal 140. In this arrangement, head subassembly 110 is preferably physically configured so that read head 112 leads write head 114 in passing over the medium with respect to the direction of media rotation; that is, a given bit island should pass first under read head 112, and later under write head 114. This could allow for variations in spacing to be quickly conveyed to the write clock in time for a delay correction to take place before writing to the same bit island. Otherwise, delay timing would need to be stored in memory for almost an entire circumferential track worth of bits, and all delay factors would have to be stable for almost an entire rotation of the disk media before the write head 114 addresses the same bit island that was sensed by the read head 112. Preferably, the signal 126 from read head 112 is preamplified by read input stage 212 before passing amplified read signal 216 to bit position sensor electronics 502, which derives a write clock signal 140 from the sensed bit islands. Good isolation may be necessary between the low-amplitude, high-sensitivity read path (including particularly signal 126, but possibly also signals 216 and/or 138) and the high-current write path (including particularly signal 128, but possibly also signals 206 and/or 136), in order to prevent crosstalk issues between the read and write signals. Alternatively, the temporal sequence of the bit position sensing operation and a data writing operation may be arranged so that they do not occur simultaneously. Read signal 216 may be bandpass filtered by a filter (not shown) having a center frequency at the bit frequency in order to extract a stable fundamental clock 140 at the frequency at which bit islands are passing under the read head 112. Write clock signal 140 may be used as before in conjunction with delay offset signal 134 by synchronization circuit 208 to generate delayed clock 210 with which to gate the write output driver 204. The write clock 140 derived by the bit position sensor electronics 502 from the signal 126 provided by read head 112 can be used in any of several ways. For example, clock 140 may be used entirely internally within the preamp, connected only to an input of synchronization circuit 208, or it can be optionally conditioned and provided as an external signal 504 to be used by outside circuitry such as HDD controller 106 to be used in calculating an offset delay signal 134. Again, instead of providing a delay signal 134 from outside the preamplifier, this signal 134 can be generated within the preamplifier, using for example a signal from the bit position sensing circuit 502 that can be interpreted to indicate a quality of previously written data, much like bit error rate (BER) can be used as an indication of proper alignment of the write pulses to bit islands. Such processing to generate signal 134 may take place within bit position sensing circuit 502, or the processing may require an additional circuit or processor (not shown) within preamplifier 108. If the delay signal 134 is not generated outside preamplifier 108, then the write clock output 504 is optional, as indicated by the dashed line for signal 504. This optional signal 504 would then be available for use in the read phase-locked loop 118, for processing bit error rate metrics, or for other diagnostic, control, and optimization functions. An output buffer (also not shown) may be desirable to isolate and amplify (i.e., condition) write clock 140 and to provide a suitable signal 504 for communication off-chip.

Figure 6:
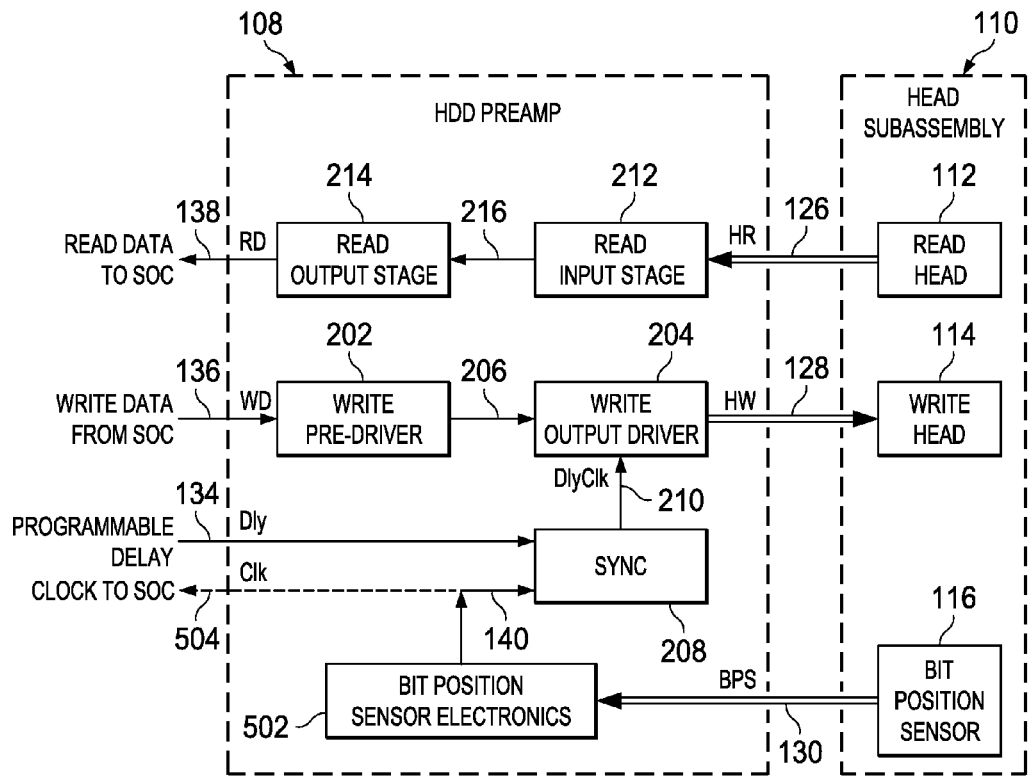
FIG. 6 is a block diagram depicting a preamplifier according to an embodiment of the present invention in which a write clock is derived from bit position signals sensed by a separate bit position sensor.

FIG. 6 is a block diagram illustrating a final architecture of a preamplifier 108 in which a write clock 140 is generated using a bit position sensor 116 that is physically associated with the write head 114, for example as an additional component in head subassembly 110, but is separate from read head 112. Bit position sensor 116 is preferably centered over the same track as write head 114, but need not be as long as neighboring tracks are in the same zone, that is have the same bit frequency. The timing information is again derived directly from the structure of the medium, and synchronization data bursts do not necessarily need to be written onto the medium along a track from which to derive a write clock signal 140. In this embodiment, bit position signals 130 generated by bit position sensor 116 are conditioned and translated into a useful write clock signal 140 by bit position sensor electronics 502. Good isolation between conductors and circuits connected to bit position sensor 116 and write head 114 may again be provided between a low-amplitude bit position sensor signal 130 and high-current write pulse signals 128 in order to minimize crosstalk and prevent the interference of write data with the bit position sensing function. Alternatively, bit position sensing and write pulsing may be arranged so that they do not occur simultaneously. A third alternative for minimizing bit position sensing crosstalk exists in this arrangement, which is to use a nonmagnetic bit position sensor such as an optical sensor that is less affected by inductive effects or magnetic fields from the write head 114. A lowpass or bandpass filter (not shown) may be used to recover the fundamental frequency associated with the bit island density and disk rotation rate. As in FIG. 5, an optional write clock output 504 may be provided. Again, an output buffer (also not shown) may be desirable to isolate and amplify, and/or otherwise condition write clock 140 and to provide a suitable signal 504 for communication off-chip if such an application need arises.

Figure 7:
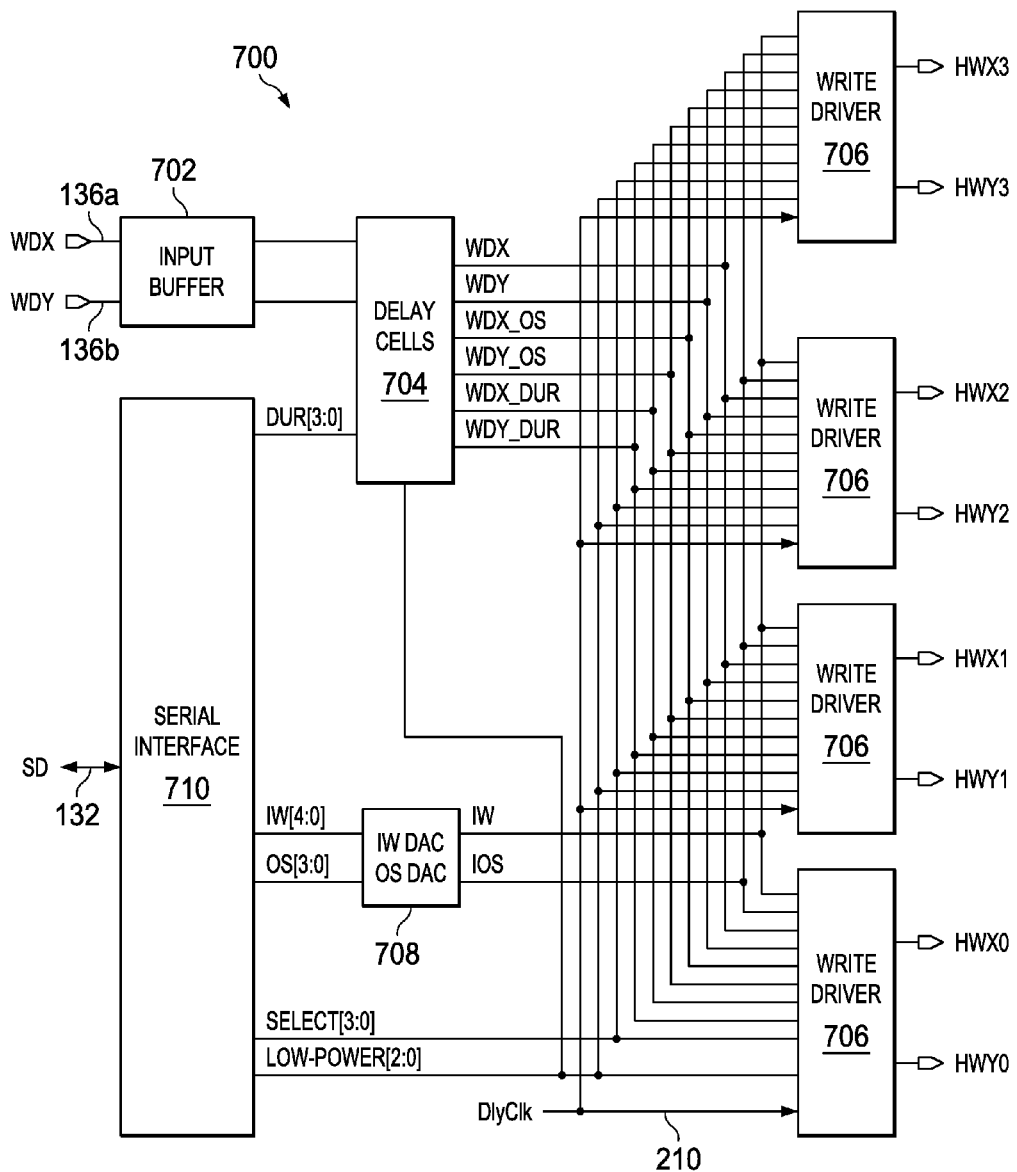
FIG. 7 is a block diagram depicting a write data path in a preamplifier according to an embodiment of the present invention.

A block diagram of an exemplary complete write data path 700 within a preamplifier is now shown with reference to FIG. 7. Incoming write data (WD) 136 signals from the HDD controller 106 are shown explicitly as consisting of a differential pair of signals WDX 136a and WDY 136b. The incoming write data are buffered by differential input buffer 702 and passed to delay cells 704 for write pulse shaping. Delay cells 704 are not used for timing to bit islands, but rather for conditioning the signals as one step in generating properly-shaped write pulses. The outputs of the delay cells are variously delayed pulses in differential pairs (WDX,WDY), overshoot signals (WDX_OS,WDY_OS), and duration signals (WDX_DUR,WDY_DUR). These signals form inputs to write drivers 706, each of which drives one head. In this example, four write drivers 706 are shown that are capable of addressing four surfaces on either 2 or 4 platters, and their outputs are differential head write signals (HWXn,HWYn), where n=0 to 3. The drivers are individually selected by a SELECT signal available at the output of serial interface block 710, which, as mentioned earlier, communicates over serial data line 132 with external circuitry such as HDD controller 106. The serial interface 710 is also used to accept digital control signals that are used to set write current IW and overshoot OS by digital-to-analog converters (DACs) in block 708. Delay clock (DlyClk) signal 210 is shown as an input to each write driver 706 to be used in gating the output for write pulse synchronization.

Figure 8:
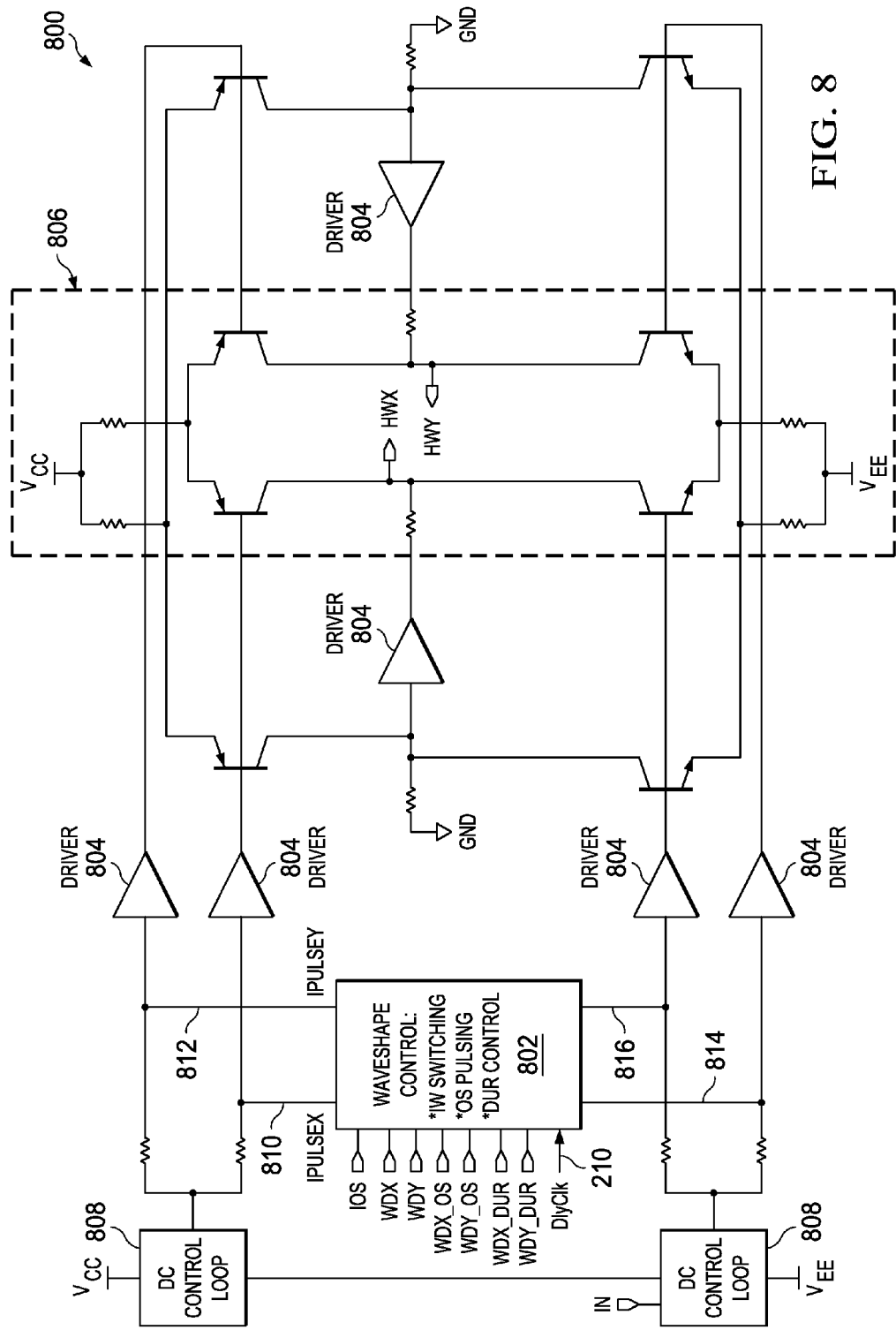
FIG. 8 is a schematic diagram depicting a circuit for controlling the write output driver according to an embodiment of the present invention.

Referring now to FIG. 8, a high-level schematic diagram of an example circuit 800 depicting circuitry internal to a write driver 706 is shown, along with one method of controlling the write output driver using the DlyClk signal 210. The write output driver is a part of write driver 706, and was indicated by reference numeral 204 in previous figures. The primary functional parts of this write driver implementation include a waveshape control circuit 802, various drivers 804 used to boost or buffer signals, an H-bridge output stage 806, and DC control loops 808 used to set and maintain various bias voltages. Besides DlyClk 210, input signals to the waveshape control circuit include the variously delayed versions of the write data, overshoot, and duration signals, and an overshoot current setting IOS. Outputs of waveshape control block 802 are current pulse signals IPULSEX 810 and 814 and IPULSEY 812 and 816. These signals are generated by symmetrical "top" and "bottom" half circuits of the waveshape control circuit 802, and are arranged in push-pull fashion so as to drive current pulses from the H-bridge 806 in both positive and negative directions at the output head write signals HWX and HWY.

Figure 9:
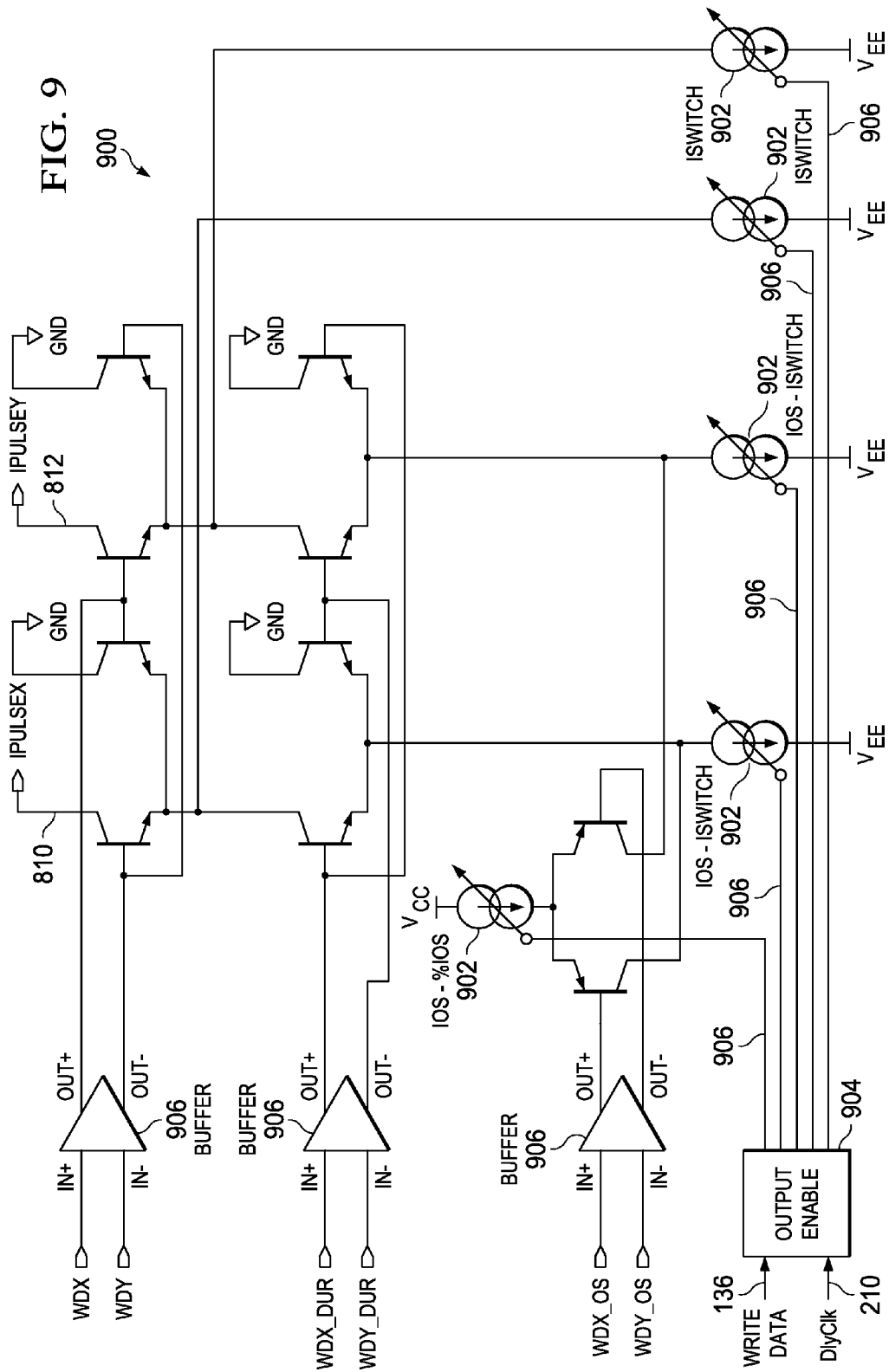
FIG. 9 a schematic diagram depicting half of a detailed circuit for controlling the write output driver according to an embodiment of the present invention.

FIG. 9 shows a more detailed schematic of a portion 900 of waveshape control circuit 802 showing one way that DlyClk 210 and the write data 136 (or conditioned versions of the write data with proper polarity and delay from elsewhere in the write data path) can be used to gate the write output driver. For simplicity, only the "top" half of the waveshape control circuit is shown, generating signals IPULSEX 810 and IPULSEY 812. The write data signals are sent through buffers 906 to drive five bipolar transistor differential pairs. The differential pairs are connected with current sources 902 supplying various values of drive current, which can be separately enabled or disabled under digital control from signals 906. Output enable logic 904 is used to properly sequence and switch control signals 906 such that a proper-polarity write pulse is generated by the waveshape control to switch the final output. Both the delayed clock signal 210 and a form of the write data 136 are required as inputs to the output enable logic so that proper polarity and timing are achieved in the write pulses.

Figure 10:
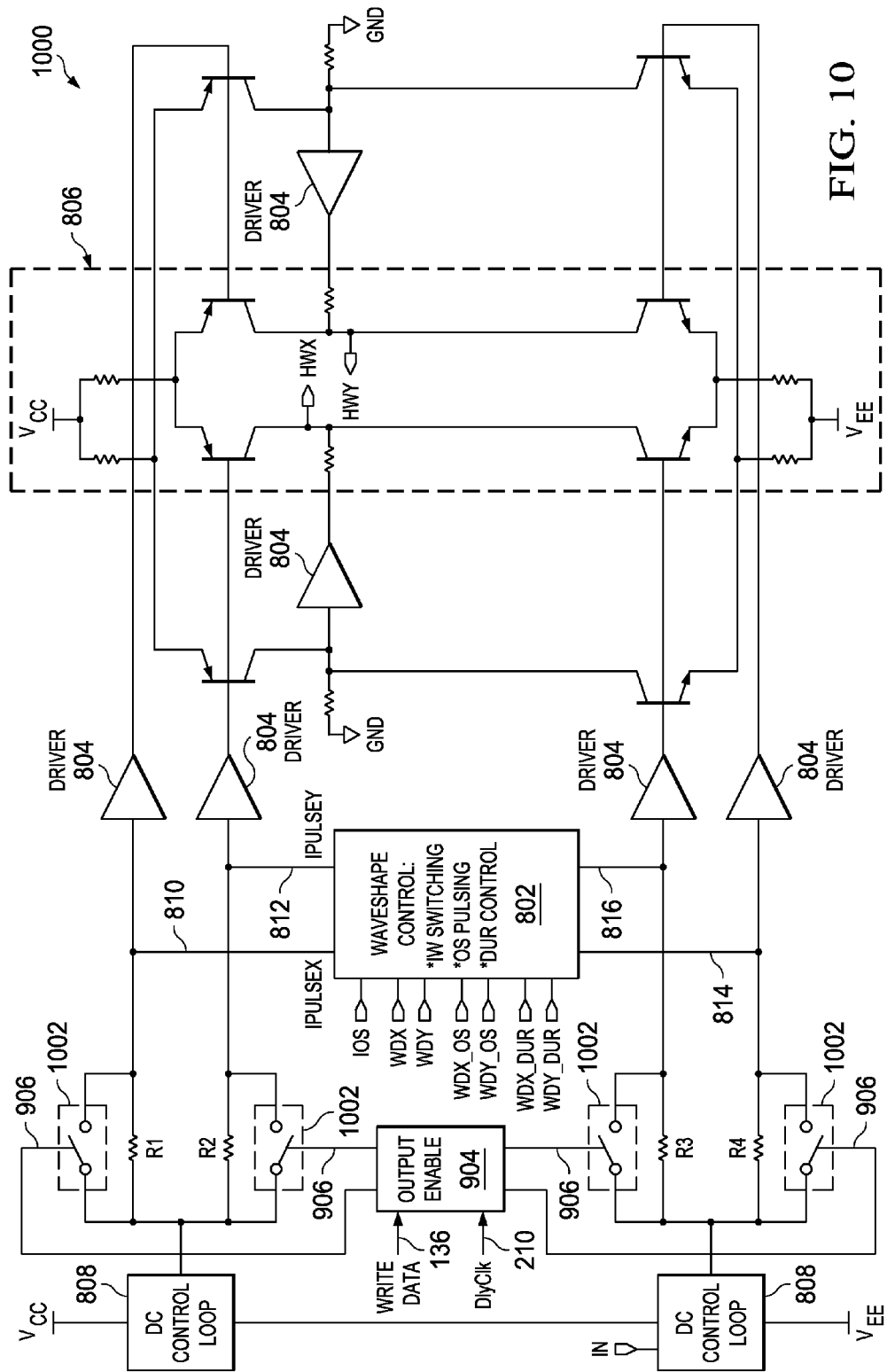
FIG. 10 is a schematic diagram depicting a circuit for controlling the write output driver according to another embodiment of the present invention.

Next, an alternative circuit 1000 for gating the output pulses generated by a write output driver within a write driver 706 is shown in the schematic diagram of FIG. 10. In this embodiment, switches 1002 are used to short pull-up resistors R1, R2, R3, and R4 that pull the input signals to driver 804 to the DC values set by DC control loops 808. Switches 1002 may be any type of controllable circuit that switches between low-impedance and high-impedance states under the command of control signals 906. For example, switches 1002 may be implemented as differential pairs of transistors. Output enable 904 again requires inputs of both DlyClk 210 and write data 136 (or a suitably delayed or conditioned version of write data 136) in order to implement the necessary combination of open and closed switches for generating write pulses having proper polarity and timing.

Figure 11:
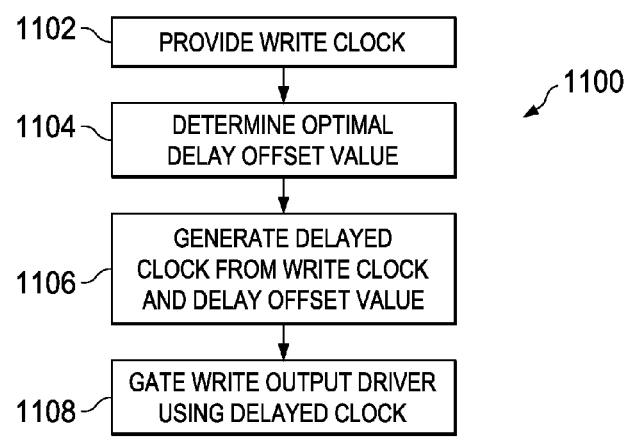
FIG. 11 is a flow chart depicting a method for synchronizing the timing of write pulses to bit islands of a patterned media disk drive according to an embodiment of the present invention.

Finally, a flow chart depicting a method 1100 for synchronizing the timing of write pulses to bit islands in patterned media according to an embodiment of the present invention is shown in FIG. 11. First, a write clock is provided in step 1102. Although this signal is referred to as a "clock," it is not exactly periodic, since it needs to adjust to variations in bit frequency. The write clock may be considered to be a more general timing signal, having a duty cycle that need not be 50%, or indeed a square pulse shape, and it need not have the same frequency as the bit frequency. For example, the write clock may have a frequency that is equal to the bit frequency, a multiple of the bit frequency, or indeed any rationally related frequency such that a constant phase may be maintained between the write clock and the bit frequency. Several alternatives for recovering or generating a write clock have been discussed heretofore. Next, in step 1104, an optimal delay offset value is determined that will ultimately lead to synchronization of write pulses to optimally magnetize the bit islands. The optimal delay offset value may be determined using one of several methods already discussed, including finding a delay offset value that results in a minimum for a bit error rate of written and readback data, and may include a calibration step that is performed during manufacturing or at startup to account for part-to-part variations, temperature variations, supply voltage variations, and the like. Referring briefly to FIG. 1, the delay offset value may be determined within the HDD preamp 108, within the HDD controller 106, or even entirely outside the hard disk drive 104, such as by software within the host system 102. Then a delayed clock is generated in step 1106 from the write clock and the delay offset value. Finally, in step 1108, signals in the write output driver are gated using the delayed clock to produce properly-synchronized write pulses to apply to the write head when bit islands are properly aligned to it as they pass.

A number of advantages provided by the present invention will be readily apparent to those skilled in the art. By using a delayed clock to gate the write output driver close to the output stage, timing of write pulses will be less subject to variation, instability, drift, and jitter than by delaying the incoming write data. By including a synchronization circuit within the preamplifier to generate a delayed clock from a write clock given a delay offset value, similar variations caused by uncertainty in the timing of the delayed clock are avoided. And by optionally generating or recovering the write clock within the preamplifier, additional uncertainty in write clock delay is reduced due to the shorter distances propagated over variable interconnect lengths between the read head or bit position sensor and the write clock source.

The present invention has been described in connection with applications within a hard disk drive data storage system having magnetic recording media containing bit islands of magnetizable material separated by nonmagnetic regions. It will be appreciated that such a hard disk drive system is representative of only one suitable environment for use of the invention, and that the invention may be used in a multiple of other environments in the alternative. To present two examples, the invention may be used in other types of data storage systems in which the recording media contain discrete bit islands, including magnetic tape drives or storage cards, but in which the recording medium moves in a linear rather than a rotary fashion during reading and writing. It may also be used in storage systems that do not contain magnetic media, such as optical disk drives having an optical recording medium in which data storage areas to be written are physically isolated in a similar way to the magnetic bit islands described herein. The invention should therefore not be limited to the particular implementations heretofore discussed.

Although preferred embodiments provided by the present invention have been described in detail, and several alternative forms of the invention have been shown, it will be apparent to those skilled in the art that the principles taught herein may be implemented in many other ways and by using circuits and methods differing in a number of details. It will therefore be understood by those skilled in the art that various modifications can be made therein without departing from the spirit and scope of the invention as set forth in the appended claims.

I claim:

1. A preamplifier for a magnetic storage device, the storage device having a recording medium patterned into discrete magnetizable bit islands and a write head and a read head passing over the bit islands, the preamplifier comprising:
   a write pre-driver configured to accept and condition write data;
   a synchronization circuit configured to accept a write clock and a delay offset signal and to produce therefrom a delayed clock; and
   a write output driver responsive to the delayed clock, connected to receive conditioned write data from the write pre-driver, and configured to send write pulses to the write head for magnetizing the bit islands, wherein the write output driver is acted upon by the delayed clock such that the write pulses are synchronized with the passing of the write head over the bit islands, wherein the write clock is extracted from the write data within the preamplifier.

2. The preamplifier as recited in claim 1, further comprising a read preamplifier generating read data from the read head, wherein the write clock is recovered from the read data.

3. The preamplifier as recited in claim 1, further comprising a bit position sensing circuit configured to generate a write clock from a signal produced by the read head.

4. The preamplifier as recited in claim 1, further comprising a bit position sensing circuit configured to generate a write clock from a signal produced by a bit position sensor separate from the read head.

5. The preamplifier as recited in claim 1, wherein the delayed clock acts upon a waveshape control circuit within the write output driver to gate the write pulses.

6. The preamplifier as recited in claim 5, wherein current sources within the waveshape control circuit are enabled and disabled by the delayed clock.

7. The preamplifier as recited in claim 1, wherein drive signals to an output stage of the write output driver are enabled and disabled by the delayed clock.

8. The preamplifier as recited in claim 1, wherein the delay offset signal is generated outside the preamplifier.

9. A method for synchronization of write pulses to bit islands of a patterned media disk drive used to store data for a host system, the disk drive having (a) a magnetic recording medium rotating at a rotation rate, and having at least one circumferential data track patterned into discrete magnetizable bit islands with a density along the track, the density of bit islands and the rotation rate determining a bit frequency; (b) a head subassembly having a write head and a read head; and (c) a preamplifier having a write output driver and receiving write data signals; the method comprising:
   providing a write clock;
   determining an optimal value of a delay offset,
   generating a delayed clock from the write clock using the delay offset; and
   gating the write data signals in the write output driver using the delayed clock to produce write pulses synchronized for magnetizing the bit islands, wherein the step of providing comprises extracting the write clock from the write data within the preamplifier.

10. The method as recited in claim 9, wherein the preamplifier amplifies signals from the read head to produce read data, and the step of providing comprises recovering the write clock from the read data.

11. The method as recited in claim 10, wherein the recovering comprises recovering the write clock using a phased-lock loop located within the preamplifier.

12. The method as recited in claim 9, wherein the read head passes over a bit island before the write head, and the step of providing comprises deriving the write clock from a signal from the read head.

13. The method as recited in claim 12, wherein the deriving comprises filtering a signal from the read head using a bandpass filter having a center frequency at the bit frequency.

14. The method as recited in claim 9, wherein the write clock has a frequency equal to the bit frequency.

15. The method as recited in claim 9, wherein the preamplifier amplifies signals from the read head to produce read data, and the step of determining an optimal value of a delay offset further comprises determining a bit error rate of the read data.

16. The method as recited in claim 9, wherein the step of determining an optimal value of a delay offset is performed within the host system.

17. The method as recited in claim 9, wherein the head subassembly further comprises a bit position sensor, the bit position sensor passes over a bit island before the write head, and the step of providing comprises deriving the write clock from a signal from the bit position sensor.

18. The method as recited in claim 9, wherein the step of determining further comprises the step of performing a calibration to store a correction of the delay offset for later lookup.

* * * * *